July 28, 1953  W. E. DE WALD  2,646,687
HELICAL SHAFT MACHINE
Filed June 15, 1951  5 Sheets-Sheet 1
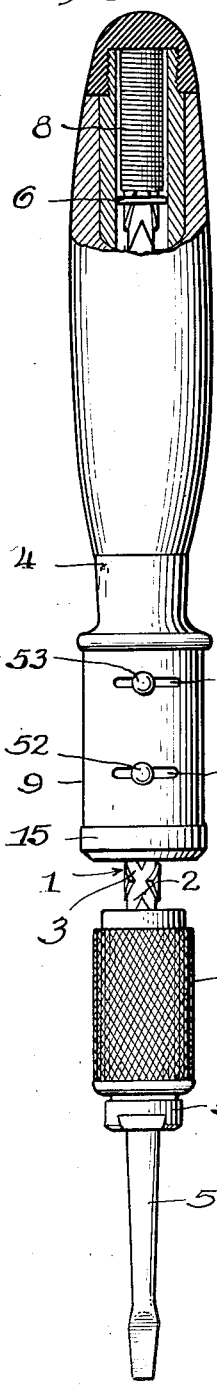
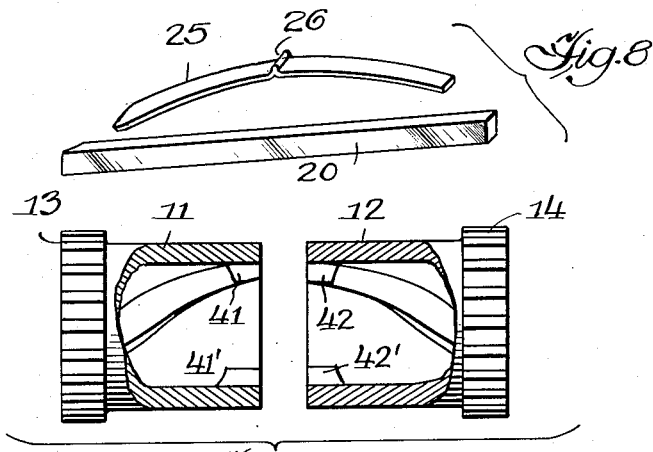
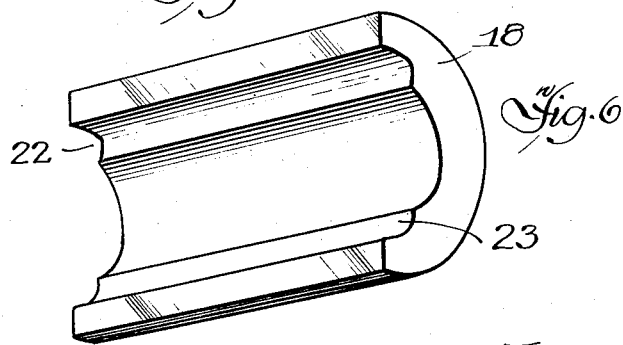
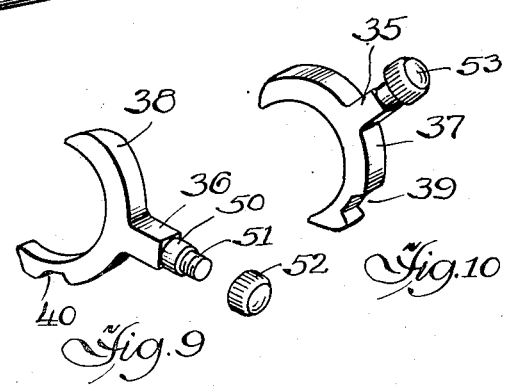
Inventor,
William E. DeWald,
By: Frederick F. Mason
Atty.

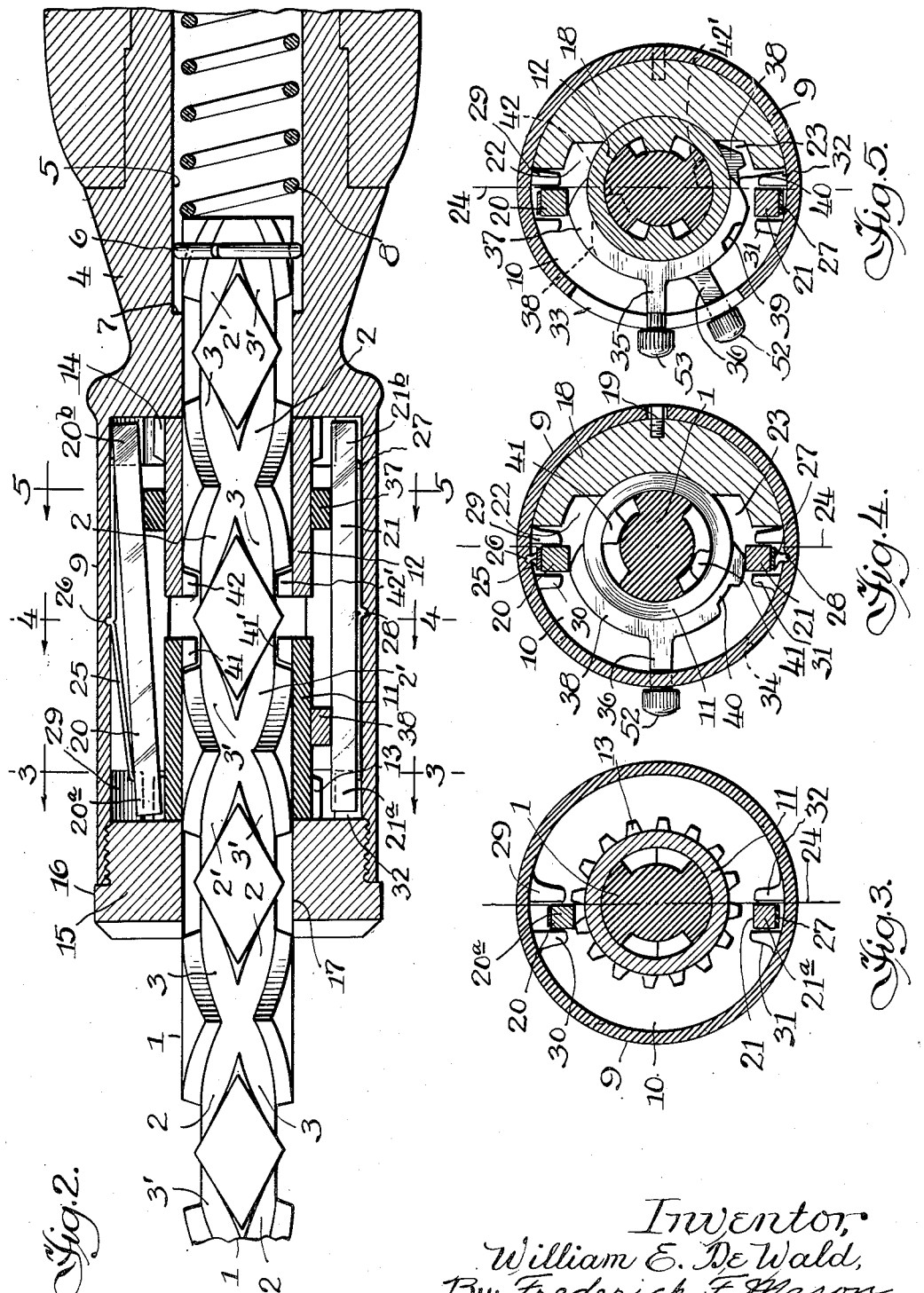

July 28, 1953   W. E. DE WALD   2,646,687
HELICAL SHAFT MACHINE
Filed June 15, 1951   5 Sheets-Sheet 3
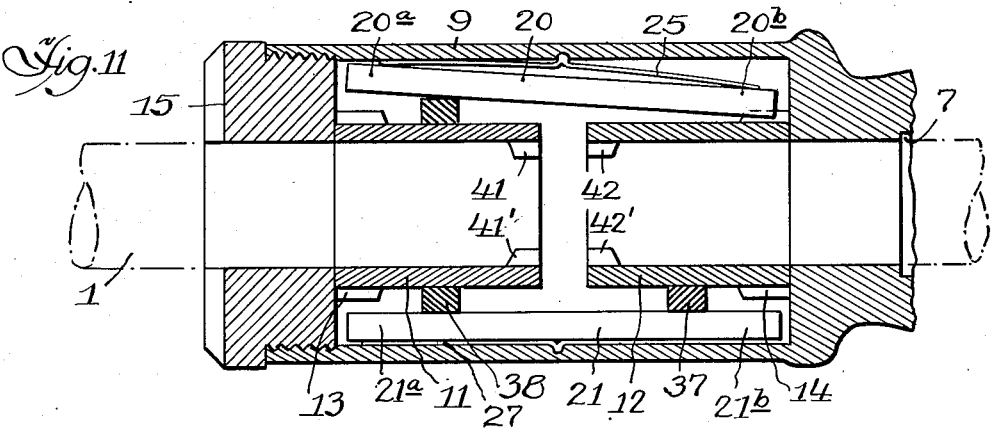
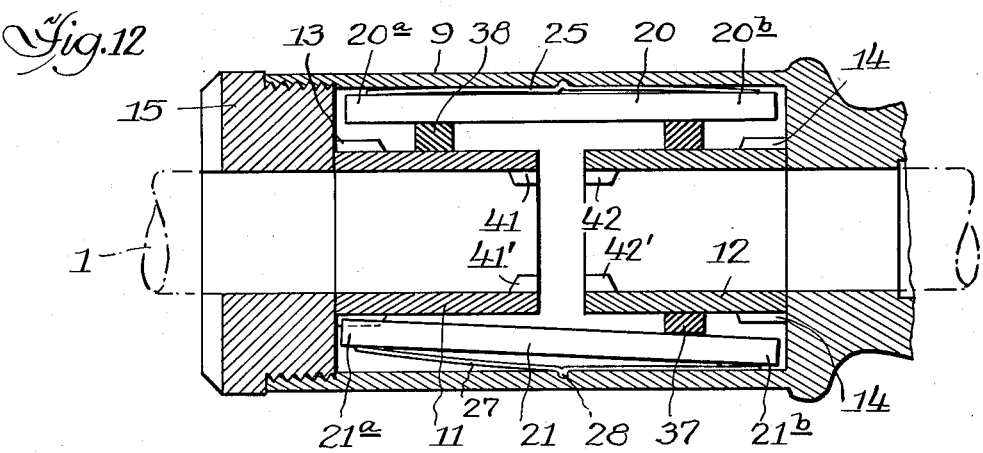
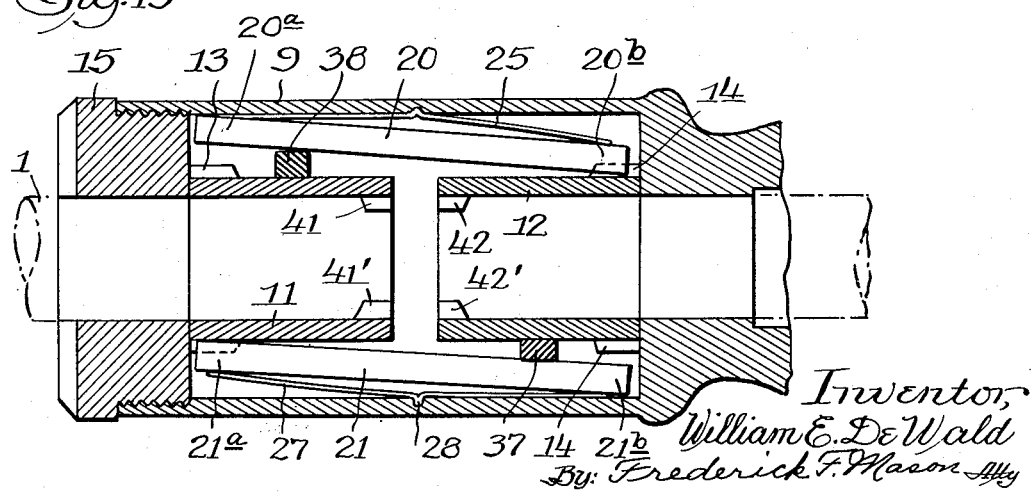
Inventor,
William E. De Wald
By: Frederick F. Mason  Atty July 28, 1953  W. E. DE WALD  2,646,687
HELICAL SHAFT MACHINE
Filed June 15, 1951  5 Sheets-Sheet 4
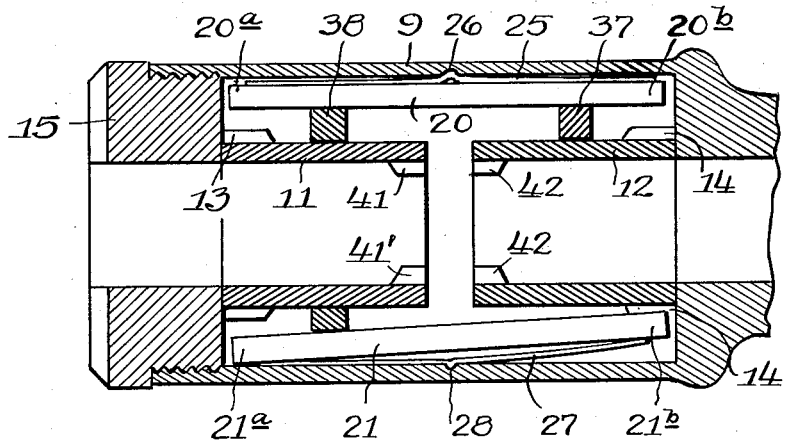
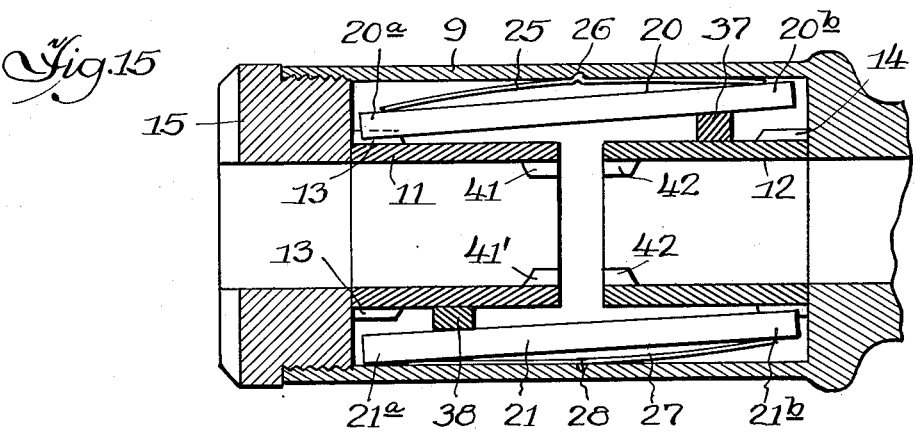
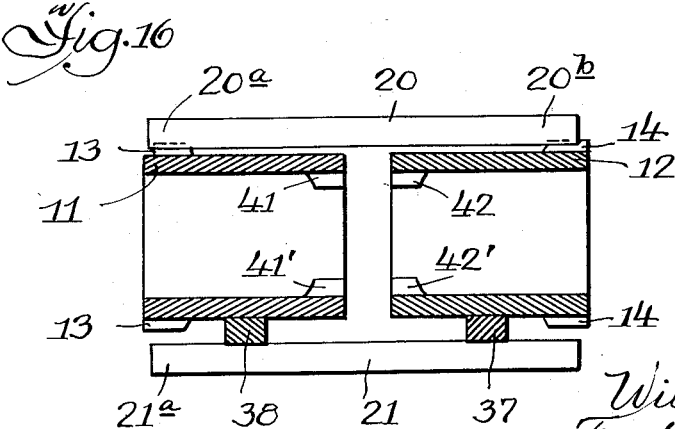
Inventor,
William De Wald
By: Frederick F. Mason
Atty.

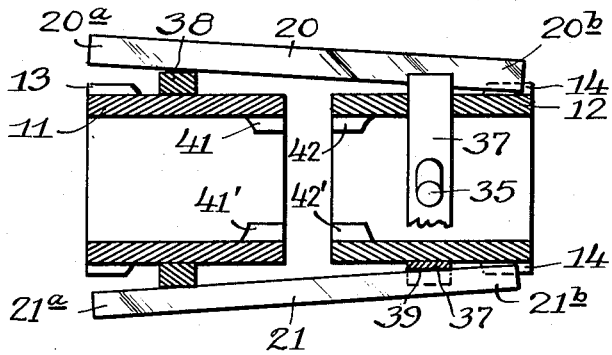
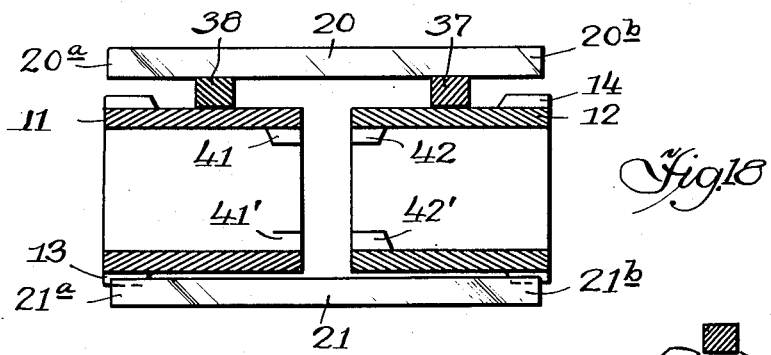
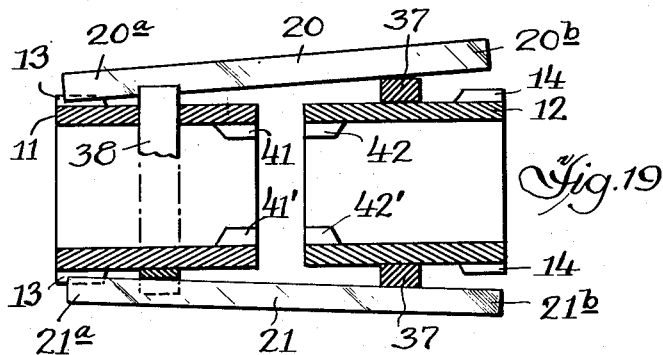
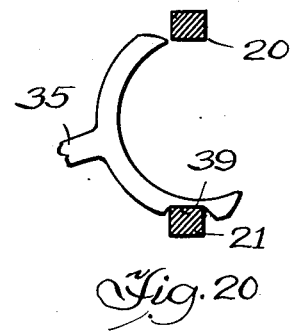
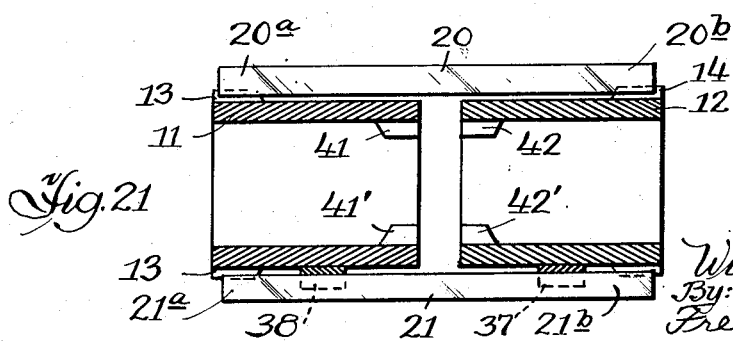

Patented July 28, 1953

2,646,687

UNITED STATES PATENT OFFICE 2,646,687

HELICAL SHAFT MACHINE

William E. De Wald, Chicago, Ill.

Application June 15, 1951, Serial No. 231,867

17 Claims. (Cl. 74—127)

This invention relates to a helical shaft and a housing movable longitudinally thereof, said housing containing means for selectively effecting various movements of the shaft or the housing.

More particularly the shaft is formed with helical grooves one of which extends in a right hand direction and another of which extends in a left hand direction, and the housing contains a pair of longitudinally spaced sleeves each having external teeth, and an internal projection for following its respective groove, and means for selectively controlling the rotation of either or both of said sleeves with relation to the housing for enabling a wide variety of movements of the shaft or the housing.

While not limited thereto, the invention, for illustrative purposes only, is shown in the drawings as applied to a tool of the general type of a screw driver, socket wrench, twisting tool, or the like. I wish it understood however, that it is capable of a large variety of uses to which the selective turning of a shaft or the housing is adapted.

Considering said housing as being pulled or pushed along the shaft, and the terms "clockwise" and "counterclockwise" as applying when looking downwardly toward the upper end of the shaft or any handle that might be thereon, some, but not all, of the movements of the shaft, when the housing is pulled or pushed along the shaft, obtainable upon selective manipulation of said means for controlling the rotation of said sleeves are:

1. The shaft will remain idle (stationary) when the housing is pulled away from the working end of the shaft, and will rotate clockwise when the housing is pushed toward the working end of the shaft, which movement for brevity may be stated to be—idle on the pull—turn clockwise on the push.
2. Idle on the pull—turn counterclockwise on the push.
3. Idle on the pull—lock when pushed, so the handle cannot get any closer to the job.
4. Idle on the push—turn clockwise on the pull.
5. Idle on the push—turn counterclockwise on the pull.
6. Idle on the push—lock when pulled so the handle cannot move away from the work.
7. No idle—shaft turn continuously clockwise on both the push and on the pull.
8. No idle—shaft turn clockwise on the push and counterclockwise on the pull.
9. No idle—shaft turn continuously counterclockwise on both the push and on the pull.
10. No idle—shaft turn counterclockwise on the push and clockwise on the pull.
11. Positive lock of the shaft on both the push and on the pull.
12. Idle on both the push and on the pull.

Among the objects of my invention are: to provide a new and improved helical shaft machine; to provide a helical shaft machine having selectively operable control means for carrying into effect one, some, or all of the above mentioned actions; and such further objects, advantages and capabilities, inherently possessed by my invention, as will later more fully appear.

My invention further resides in the combination, construction and arrangement of parts illustrated in the accompanying drawings, and while I have shown therein a preferred embodiment I wish it understood that the same is susceptible of modification and change without departing from the spirit of my invention.

In the drawings:

Fig. 1 is a side elevation, partly in section, of a helical shaft machine embodying my invention.

Fig. 2 is a fragmentary, enlarged, longitudinal section through the housing and part of the handle, the shaft being shown in elevation.

Fig. 3 is a transverse section on the line 3—3 of Fig. 2.

Fig. 4 is a transverse section on the line 4—4 of Fig. 2.

Fig. 5 is a transverse section on the line 5—5 of Fig. 2.

Fig. 6 is a perspective view of the spacer.

Fig. 7 is a side elevation, partly in section, of the two sleeves in their normal spaced apart position.

Fig. 8 is an exploded perspective view of one of the clutch bars and its spring.

Fig. 9 is a perspective view of one of the two saddle members, showing its retaining button slightly displaced.

Fig. 10 is a perspective view of the other saddle member with its retaining button in place thereon.

Fig. 11 is a fragmentary, longitudinal section of the housing, on an enlarged scale, showing a portion of the shaft in broken lines, and the two clutch bars in position for given operations.

Fig. 12 is a view similar to Fig. 11, but with the clutch bars in position for other given operations.

Fig. 13 is a view similar to Fig. 11, but with the clutch bars in position for still other given operations.

Fig. 14 is a view similar to Fig. 11, but with the clutch bars in position for other given operations.

Fig. 15 is a view similar to Fig. 11, but with the clutch bars in position for further given operations.

Fig. 16 is a longitudinal section through the two sleeves and showing the clutch bars in position for still other given operations.

Fig. 17 is a view similar to Fig. 16, but showing one of the saddle members in fragmental elevation, and the clutch bars in position for other given operations.

Fig. 18 is a view similar to Fig. 16, but showing the clutch bars in position for further given operations.

Fig. 19 is a view similar to Fig. 17, but showing the clutch bars in position for other given operations.

Fig. 20 is a transverse section through the two clutch bars and showing in fragmental elevation one of the saddle members in one of its positions of operation.

Fig. 21 is a view similar to Fig. 16, but showing the clutch bars in position for still other given operations.

In the drawings, for illustrative purposes only, my invention is shown as applied to a tool of the general type of a screw driver, socket wrench, drill, wire twister, or the like, and comprising a shaft 1 having extending along its length double helical grooves 2 and 3, of which groove 2 extends in a right hand direction, and groove 3 extends in a left hand direction, as viewed from the top. These grooves cross each other as will be understood in Fig. 2. Rotatably mounted on the rear end (right hand end in Fig. 2) of shaft 1 is a handle 4 having a central bore 5 of somewhat greater inside diameter for a portion of its length than the outside diameter of shaft 1, to provide space for an expansion spring ring 6 seated in a circumferential groove in shaft 1, to permit the shaft to move longitudinally within the bore of the handle 4, but prevent it from being pulled entirely out therefrom by reason of the ring 6 striking shoulder 7 in the handle bore 5.

Mounted in the handle bore 5 is a coil compression spring 8 bearing at one end against the rear end of shaft 1, and at the other end against a closed end, shoulder or any suitable abutment to permit the handle to be pushed longitudinally along the shaft in one direction, and be returned by the compressed spring in the other direction. Fixed to the handle 4 (integral or otherwise as desired) to extend partway along the shaft, concentric therewith, but radially spaced therefrom, is a cylindrical housing 9 having an annular space 10 between the shaft and housing for the reception of control parts later more fully described.

Rotatably mounted on shaft 1, within housing 9 are a pair of longitudinally spaced sleeves 11 and 12, each of which sleeves has on its end toward the respective end of the housing, gear teeth spaced around its circumference and preferably of short length. The teeth on the sleeve 11 are designated at 13 and are located on the left hand end of sleeve 11 as viewed in Fig. 2. The teeth on the sleeve 12 are designated at 14 and are located on the right hand end of sleeve 12 as viewed in Fig. 2. In Fig. 2 it is also seen that the left hand end of housing 9 is closed by an end member 15 threaded thereinto and having an annular flange 16 abutting the end of the housing when in final position. End member 15 is formed with a central hole 17 of a size to permit the shaft to rotatably slide longitudinally therethrough.

Positioned within housing 9 on one side of the annular space 10 is a spacer 18 (see Figs. 4 and 5), which holds the sleeves spaced longitudinally apart to prevent any frictional drag therebetween when they rotate in opposite directions relatively to each other. Spacer 18 is held against circumferential movement in housing 9 by a pin 19 passing through the housing and into the spacer. The circumferential width of spacer 18 is less than one half of a circle so as to be amply free of the clutch bars 20 and 21 later more fully explained. Also along each of its side edges spacer 18 is formed along its length with an inwardly disposed recess 22 and 23 for a purpose explained more fully later herein.

Clutch bars 20 and 21 are each preferably of approximately square cross section and of a length such that their end portions will selectively contact and be disengaged from teeth 13 and 14. These clutch bars extend longitudinally within the annular space 10 within housing 9, and are so positioned that their right hand side faces, as viewed in Fig. 3, both lie within a plane 24 passing through the axial center of shaft 1, with the body of the clutch bars each being to the left of said plane 24, with one clutch bar being on one side of sleeves 11 and 12 and the other clutch bar being on the other side thereof. Clutch bar 20 is normally urged inwardly toward teeth 13 and 14 by an elongated leaf spring 25 which midway of its length on the outer face thereof is formed with a rounded extension or head 26 seated in a complemental recess formed on the adjacent portion of the inner face of the housing. Clutch bar 21 is likewise provided with a similar spring 27 having a similar head 28. Heads 26 and 28 permit springs 25 and 27 to rock, but prevent their longitudinal displacement.

Any suitable means desired may be used, such as circumferentially spaced inwardly extending projections 29, 30, 31 and 32 (see Figs. 3–5), for holding each of the clutch bars against circumferential displacement, but permitting them to bodily move at either or both ends toward and away from teeth 13 and 14 to be engaged with or disengaged from, said teeth. One side of the housing 9, opposite from the side having the spacer 18, is formed with a pair of longitudinally spaced, circumferentially extending slots 33 and 34 for slidably receiving the outwardly extending handles 35 and 36 of the two saddle members 37 and 38 respectively. As seen in Figs. 4 and 5, each of saddle members 37 and 38 is of arcuate shape with its inner face of the same curvature as the outer face of its respective sleeve 11 or 12 so as to slidably engage the same circumferentially.

The outer surface of each end of each of the saddle members is inclined to a cam or wedge shape so as to slide under and lift up the respective end of the clutch bar when pushed thereunder by sliding that particular saddle member in that direction by its saddle handle 35 or 36. When such wedge or cam end at either end of either of the clutch bars is moved from under that end or ends of the clutch bar or bars the latter will be moved into contact with the adjacent teeth 13 or 14 under pressure of one or the other, or both, of springs 25 and 27. It is thus seen that any of the clutch bar ends may be moved into or out of contact with the respective teeth, by movement of the saddle handle or handles in the desired direction in its or their slot or slots.

As seen in Fig. 5, each of the saddle members 37 and 38 is formed in its outer face near its lower end as viewed in Figs. 4, 5, 9 and 10, with a recess extending across the full width thereof longitudinally of the shaft, to permit the respective end portions of clutch bar 21 to be seated therein, to enable one or the other, or both, of the ends of this clutch bar to selectively contact with one or the other, or both, of the sets of teeth 13 and 14, as desired for purposes later more fully explained. This recess in saddle member 37 is designated at 39, and in saddle member 38 it is designated at 40. Also as will be noted in Figs. 4 and 5, the spacer member recesses 22 and 23 are in position to permit the respective adjacent ends of the saddle members to move thereinto when desired.

As stated earlier herein each of the sleeves 11 and 12 is formed with an internal projection for following its respective helical groove in the shaft. Preferably each of these sleeves has a pair of such projections or ribs diametrically opposite each other, which in sleeve 11 are indicated at 41 and 41', and in sleeve 12 are indicated at 42 and 42'. The pair of internal projections 41 in sleeve 11 are of right hand helical formation, while the pair in sleeve 12 are of left hand helical formation. While a single right hand helical groove and a single left hand helical groove could be used in shaft 1, and a single right hand helical projection or rib and a single left hand helical projection or rib could be used in sleeves 11 and 12 respectively, I prefer to form the shaft 1 with a pair of diametrically opposite right hand grooves, and a pair of diametrically opposite left hand grooves, as seen in Fig. 2. The trailing right hand groove, which is 180 degrees behind groove 2 in shaft 1, is indicated at 2', and the trailing left hand groove, which is 180 degrees behind groove 3 therein is indicated at 3'. Likewise the trailing right hand rib 41' is 180 degrees behind right hand rib 41 in sleeve 11, and the trailing left hand rib 42' is 180 degrees behind left hand rib 42 in sleeve 12.

The right hand ribs 41 and 41' in sleeve 11 are slidably seated one in each of the right hand grooves 2 and 2', and the left hand ribs 42 and 42' in sleeve 12 are slidably seated one in each of the left hand grooves 3 and 3'. It is thus seen that if sleeve 11 is held against rotation with relation to housing 9 and sleeve 12 is permitted to rotate in the housing, the two right hand ribs 41 and 41' of sleeve 11 will likewise be held against rotation, and as the handle and housing are moved longitudinally of the shaft the shaft will be caused to rotate in one direction or the other depending upon the direction of movement of the housing longitudinally along the shaft. This is because the ribs 41 and 41', when the housing is moved longitudinally along the shaft, with sleeve 11 held against rotating and sleeve 12 rotating, will in one direction of movement push against one side of their respective groove in the shaft to push the shaft rotatively in one direction, and when the housing is moved longitudinally along the shaft in the other direction, the other side of each of ribs 41 and 41' will push against the other side of its respective groove in the shaft to push the shaft rotatively in the opposite direction.

If however sleeve 12 is held against rotation with relation to housing 9, and sleeve 11 is permitted to rotate therein, similar operations will take place but in opposite directions of rotation of shaft 1 for similar movement of the housing 9 along shaft 1. Also if both of sleeves 11 and 12 are left free to rotate freely in housing 9, movement of the housing longitudinally along the shaft in either direction will produce no rotation of the shaft, which will merely rotate one sleeve idly in one direction and rotate the other sleeve idly in the other direction. This is what I term idling of the shaft both on the push and on the pull of the housing.

An important feature of my invention is the arrangement of the two longitudinally extending clutch bars 20 and 21 on opposite sides of the sleeves 11 and 12, with the right hand side face of each, as viewed in Figs. 3-5, at both ends of the bar, falling in plane 24 passing longitudinally through the axis of rotation of shaft 1, and with the body of each clutch bar to the left of said plane. When either end portion of either clutch bar is forced against the adjacent set of teeth 13 or 14 by spring 25 or 27, see for example end 20a of clutch bar 20 in the upper portion of Fig. 3, the inner corner thereof at said diametrical plane 24 is closer to the center of the circle of the outer ends of the teeth than is the other corner of the inner face of the clutch bar. This means that when sleeve 11, carrying with it teeth 13, tries to rotate counterclockwise as viewed in Fig. 3, the advancing side of the nearest tooth will strike the inner edge of the clutch bar end 20a at said plane and stop further rotation of that particular sleeve, which in the position shown in Fig. 3 is sleeve 11. However when sleeve 11 is rotated clockwise as viewed in Fig. 3, the clutch bar end 20a will not stop the rotation of the sleeve because, due to the left hand inner corner of end 20a of the clutch bar 20 being farther away from the center of the circle of the outer ends of the teeth than the other inner corner at said plane, the outer ends of the teeth will strike the inner face of the clutch bar end 20a instead of the side face thereof, and cam therepast as each tooth comes opposite the clutch bar end. In other words, referring to Fig. 3 and clutch bar end 20a, the position of parts is such that the sleeve 11 can rotate freely in clockwise direction, but is prevented from rotation in counterclockwise direction. This is not affected in any way by the clutch bar end 21a in the position shown in Fig. 3 because the clutch bar end 21a is shown as being held away from contact with the teeth by the adjacent end of saddle member 38 (see Fig. 4).

If however, the saddle member 38 be shifted to raise the clutch bar end 20a away from contact with the teeth 13, and free clutch bar end 21a to be moved into contact with teeth 13 under bias of spring 27, the reverse would be true, that is, the sleeve 11 would be locked against rotation in a clockwise direction but can rotate freely in a counterclockwise direction. This again is because the inner corner of the clutch bar end 21a at said diametrical plane is nearer to the center of the teeth circle than the other inner corner, with the result that the teeth would be stopped by said nearer corner if attempt is made to rotate sleeve 11 in a clockwise direction, but would cam over the inner face of clutch bar end 21a and permit free rotation of sleeve 11 in a counterclockwise direction.

The same actions would occur at the other end of the housing with reference to the clutch bar ends 20b and 21b and teeth 14 of sleeve 12, as will be understood when it is remembered that the clutch bar ends 20b and 21b stand in the same position with relation to the diametrical plane 24 as do clutch bar ends 20a and 21a, as seen by comparing Figs. 3 and 5. In other words if clutch bar end 20b was being pressed against the teeth 14 by spring 25, and clutch bar end 21b was being held away from contact with these teeth (disregarding the other ends of the clutch bars for the moment) by the saddle member 37, the parts would be in the same relative position as the parts in Fig. 3, and sleeve 12 would be locked against rotation in a counterclockwise direction, and be free to rotate in a clockwise direction. From the foregoing it is seen that by manipulation of the two saddle members 37 and 38 the two clutch bars 20 and 21 may each be selectively moved so as to bring either or both ends of either or both of the clutch bars, into or out of contact with the respective teeth adjacent thereto, as desired. The various actions produced by various positions of the clutch bar ends, with relation to the teeth, as referred to above, will now be described.

The positions of the parts for the various movements of the shaft, will in the following description, follow the same order as that listed under movements numbered 1 through 12 in columns 1 and 2 hereof.

POSITION NO. 1

*Shaft idle on pull—turn clockwise on push*

Position No. 1 of the clutch bars 20 and 21 with relation to the teeth 13 and 14, to cause the shaft to idle (remain stationary) on the pull of the housing rearwardly therealong, and to turn clockwise as the housing is pushed forwardly therealong, is shown in Fig. 11. In this position the saddle members 37 and 38 have been so shifted as to bring clutch bar end 20b into contact with teeth 14, under action of spring 25, and the other three clutch bar ends 20a, 21a and 21b away from contact with their respective adjacent teeth. This means that sleeve 12 will rotate freely in the clockwise direction as viewed in Fig. 3, and lock in the counterclockwise direction. This will not be disturbed by clutch bar end 21b because it is held away from teeth 14 by saddle member 37.

Also sleeve 11 will rotate freely in both clockwise and counterclockwise directions because both of clutch bar ends 20a and 21a are held away from contact with teeth 13 by saddle member 38. Consequently when the housing is pulled rearwardly along the shaft, sleeve 11 will rotate freely in a counterclockwise direction, and sleeve 12 will rotate freely in a clockwise direction. When however the housing is pushed forwardly along the shaft, the sleeve 12 will be locked against rotation in a counterclockwise direction, but sleeve 11 will rotate freely in a clockwise direction. From the foregoing it will be understood that with the parts in Position No. 1, the shaft will idle on the pull of the housing, and will rotate clockwise on the push of the housing. Throughout this specification, unless specifically stated to the contrary, the terms "clockwise" and "counterclockwise" will be used to apply when looking toward the rear end of the handle, or in other words, as viewed in Figs. 3–5.

POSITION NO. 2

*Idle on pull—counterclockwise on push*

Position No. 2 of the parts in housing 9, to cause the shaft 1 to idle on the pull of the housing rearwardly therealong, and to rotate counterclockwise as the housing is pushed forwardly therealong, is shown in Fig. 12. In this position the saddle members 37 and 38 have been so shifted in the housing as to bring clutch bar end 21a into contact with teeth 13, under action of spring 27, and to hold the other three clutch bar ends 21b, 20a and 20b away from contact with their respective adjacent teeth. Thus sleeve 12 is free to rotate in either direction on shaft 1, and sleeve 11 is free to rotate in a counterclockwise direction on shaft 1 because of teeth 13 slipping over the inner face of end 21a of the clutch bar 21 due to the offset position of this clutch bar. Sleeve 11 however is not free to rotate in a clockwise direction on shaft 1 because of teeth 13 being locked against clutch bar end 21a and preventing rotation in that direction. Consequently this causes the shaft 1 to be rotated in a counterclockwise direction when the housing 9 is pushed forwardly along the shaft, but permits the shaft to idle when the housing is pulled rearwardly along the shaft.

POSITION NO. 3

*Idle on pull—lock on push*

Position No. 3 of the parts in housing 9, to cause the shaft 1 to idle on the pull of the housing rearwardly therealong, and to be locked against rotation in the housing when the housing is pushed in a forward direction with relation to the shaft, is shown in Fig. 13. This position is the same as Position No. 2 in Fig. 12, except that the clutch bar end 20b in Position No. 3 has been released by movement of saddle member 37 to permit spring 25 to force end 20b into contact with teeth 14. This means that clutch bar ends 21a and 20b are in contact with teeth 13 and 14 respectively, and that clutch bar ends 20a and 21b are away from the teeth. It should be remembered that when clutch bar end 21a and clutch bar end 20b are in contact with teeth 13 and 14 respectively, that teeth 13 will slip counterclockwise and hold clockwise, and that teeth 14 will slip clockwise and hold counterclockwise. Keeping in mind that the internal ribs 41 and 41' of sleeve 11 are of right hand lead and that internal ribs 42 and 42' of sleeve 12 are of left hand lead, it will be seen that Position No. 3 of the parts will cause the shaft 1 to be idle on the pull of the housing rearwardly therealong, and to be locked against rotation in the housing when the housing is pushed in a forward direction with relation to the shaft.

POSITION NO. 4

*Idle on push—clockwise on pull*

Position No. 4 of the parts in housing 9, to cause the shaft 1 to idle on the push of the housing forwardly therealong, and to rotate clockwise when the housing is pulled rearwardly therealong, is shown in Fig. 2. In this position the saddle members 37 and 38 have been so shifted in the housing as to bring clutch bar end 20a into contact with teeth 13, under action of spring 25, and to hold the other three clutch bar ends 20b, 21a and 21b away from contact with their respective adjacent teeth. This means that sleeve 12 is free to rotate in either direction on the shaft, while sleeve 11 (through its integral teeth 13) is influenced only by clutch bar end 20a and permitted to slip clockwise but be held counterclockwise. Due to the internal ribs in sleeve 11 being of right hand lead, a push of the housing forwardly along the shaft will merely result in teeth 13 slipping freely past its clutch in a clockwise direction (see Fig. 3). As is obvious sleeve 12 will rotate freely on the shaft because neither of its clutches is engaged with its teeth. However when the housing is moved in the opposite direction (pulled rearwardly), the tendency of teeth 13 will be to rotate counterclockwise, but they will be held by clutch bar end 20a, which will result in the shaft being rotated clockwise.

POSITION NO. 5

*Idle on push—counterclockwise on pull*

Position No. 5 of the parts in housing 9, to cause the shaft 1 to idle on the push of the housing forwardly therealong, and to rotate counterclockwise when the housing is pulled rearwardly therealong, is shown in Fig. 14. In this position the saddle members 37 and 38 have been so shifted in the housing as to bring clutch bar end 21b into contact with teeth 14, under action of spring 27, and to hold the other three clutch bar ends 20b, 20a and 21a away from contact with their respective adjacent teeth. This means that sleeve 11 is free to rotate in either direction on the shaft, while sleeve 12 (through its teeth 14) is influenced only by clutch bar end 21b and permitted to slip counterclockwise but be held clockwise. Due to the internal ribs in sleeve 12 being of left hand lead, a push of the housing forwardly along the shaft will merely result in teeth 14 slipping freely past its clutch in a counterclockwise direction. As is obvious sleeve 11 will rotate freely on the shaft because neither of its clutches is in contact with teeth 13. However when the housing is moved in the opposite direction (pulled rearwardly), the tendency of teeth 14 will be to rotate clockwise, but they will be held by clutch bar end 21b, which will result in the shaft being rotated counterclockwise. In these various positions and various movements, while the housing is being pushed forwardly or pulled rearwardly on the shaft, the housing is held against rotation by the hand of the operator.

POSITION NO. 6

*Idle on push—lock against pull*

Position No. 6 of the parts in housing 9, to cause the shaft to idle on the push of the housing forwardly therealong, and to lock the shaft against rotation in the housing when a pull is exerted against the housing in a rearward direction, is shown in Fig. 15. In this position the saddle members 37 and 38 have been so shifted in the housing as to bring clutch bar ends 20a and 21b into contact with teeth 13 and 14 respectively, under action of springs 25 and 27, and to move clutch bar ends 21a and 20b away from contact with their respective adjacent teeth. When the housing is pushed forwardly along the shaft the tendency of sleeve 11 is to turn clockwise and of sleeve 12 to turn counterclockwise, which is permitted because of the offset of clutch bars 20 and 21 permitting the teeth 13 and 14 to slip freely past and respective inner faces of clutch bar ends 20a and 21b. However when a force is exerted against housing 9 tending to pull it rearwardly of the shaft, the tendency of sleeve 11 would be to rotate counterclockwise and of sleeve 12 to rotate clockwise, which movements would be prevented by the clutch bar ends 20a and 21b striking the sides of teeth 13 and 14 respectively, and stopping rotation of the teeth in the directions stated. As the internal ribs in sleeve 11 are of right hand lead, and the internal ribs in sleeve 12 are of left hand lead, this locks the shaft against rotation in the housing as long as the force exerted against the housing is a pull in a rearward direction. However, as stated, a push on the housing will permit the shaft to idle.

POSITION NO. 7

*No idle—clockwise both push and pull*

Position No. 7 of the parts in housing 9, to cause the shaft to rotate clockwise on both a push and a pull of the housing therealong, is shown in Fig. 16. In this position the saddle members 37 and 38 have been so shifted in the housing as to bring clutch bar ends 20a and 20b into contact with teeth 13 and 14 respectively, under action of spring 25, and to move clutch bar ends 21a and 21b away from contact with their respective adjacent teeth. When the housing is pushed forwardly along the shaft, the tendency of sleeve 11 is to rotate clockwise, and the tendency of sleeve 12 is to rotate counterclockwise in the housing. As will be understood in Fig. 3 this will permit teeth 13 to slide freely over the inner face of clutch bar end 20a, but will hold teeth 14 against counterclockwise rotation in the housing which will force the shaft to rotate clockwise in the housing. When however, the housing is pulled rearwardly along the shaft the tendency of sleeve 11 is to rotate counterclockwise in the housing, and the tendency of sleeve 12 is to rotate clockwise in the housing. As will be understood in Fig. 3, this will hold teeth 13 and sleeve 11 against rotation, but will permit teeth 14 to slide freely over the inner face of clutch bar end 20b. This holding of sleeve 11 against rotation will cause shaft 1 to rotate clockwise on the pull of the housing. It is thus seen that with the parts in Position No. 7, the shaft will rotate clockwise on both the push and the pull of the housing.

POSITION NO. 8

*Clockwise on push—counterclockwise on pull*

Position No. 8 of the parts in the housing 9, to cause the shaft 1 to rotate clockwise when the housing is pushed forwardly therealong, and to rotate counterclockwise when the housing is pulled rearwardly therealong, is shown in Fig. 17. In this position the saddle members 37 and 38 have been so shifted in the housing as to bring the clutch bar ends 20b and 21b both into contact with teeth 14 of sleeve 12 under action of springs 25 and 27, and to move clutch bar ends 20a and 21a away from contact with teeth 13 of sleeve 11. The contact of clutch bar end 20b with teeth 14 is made possible by moving the adjacent end of the saddle member 37 clear of clutch bar 20 and permitting spring 25 to press them together. The contact of clutch bar end 21b with teeth 14 is made possible by providing a notch 39 (see Fig. 20) adjacent the other end of saddle member 37, into which notch clutch bar end 21b enters far enough to contact teeth 14. In Position No. 8 it is thus seen that sleeve 11 may rotate freely in either direction in housing 9. However with both clutch bar ends 20b and 21b in contact with teeth 14, it will be understood in Fig. 3 that sleeve 12 is locked against rotation in either direction with relation to the housing, and consequently, due to its internal ribs being of left hand lead, will rotate the shaft clockwise when the housing is pushed forwardly, and will rotate the shaft counterclockwise when the housing is pulled rearwardly, along the shaft.

POSITION NO. 9

*No idle—counterclockwise both push and pull*

Position No. 9 of the parts in housing 9, to cause the shaft to rotate counterclockwise on both a push and a pull of the housing therealong, is shown in Fig. 18. In this position the saddle members 37 and 38 have been so shifted in the housing as to bring clutch bar ends 21a and 21b into contact with teeth 13 and 14 respectively, under action of spring 27, and to move clutch bar ends 20a and 20b away from contact with their respective adjacent teeth. When the housing is pushed forwardly along the shaft, the tendency of sleeve 11 is to rotate clockwise, and the tendency of sleeve 12 is to rotate counterclockwise in the housing. As will be understood in Fig. 3, this will permit teeth 14 to slide freely over the inner face of clutch bar end 21b, but will hold teeth 13 against clockwise rotation in the housing which will force the shaft to rotate counterclockwise during said forward push of the housing. When however, the housing is pulled rearwardly along the shaft, the tendency of sleeve 11 is to rotate counterclockwise in the housing, and the tendency of sleeve 12 is to rotate clockwise in the housing. As will be understood in Fig. 3, this will hold teeth 14 and sleeve 12 against rotation but will permit teeth 13 to slide freely over the inner face of clutch bar end 21a. This holding of sleeve 12 against rotation will cause shaft 1 to rotate counterclockwise on the pull of the housing. It is thus seen that with the parts in Position No. 9, the shaft will rotate counterclockwise on both the push and on the pull of the housing along the shaft.

POSITION NO. 10

*No idle—counterclockwise on push and clockwise on pull*

Position No. 10 of the parts in housing 9, to cause the shaft to rotate counterclockwise when the housing is pushed forwardly therealong, and to rotate clockwise when the housing is pulled rearwardly therealong, is shown in Fig. 19. In this position of parts the saddle members 37 and 38 have been so shifted in the housing as to bring the clutch bar ends 20a and 21a both into contact with teeth 13 of sleeve 11 under action of springs 25 and 27, and to move clutch bar ends 20b and 21b away from contact with teeth 14 of sleeve 12. The engagement or contact of clutch bar end 20a with teeth 13 is made possible by moving the adjacent end of saddle member 38 clear of clutch bar 20 and permitting spring 25 to press them together. The contact of clutch bar end 21a with teeth 13 is made possible by providing a notch 40 (similar to notch 39 in Fig. 20) in the outer surface of saddle member 38 adjacent the other end thereof, into which notch clutch bar end 21a enters far enough to contact teeth 13. In Position No. 10 it is thus seen that sleeve 12 may rotate freely in either direction in housing 9. However, with both clutch bar ends 20a and 21a in contact with teeth 13, it will be understood from Fig. 3 that sleeve 11 is locked against rotation in either direction with relation to the housing, and consequently, due to its internal ribs being of right hand lead, will rotate the shaft counterclockwise when the housing is pushed forwardly, and will rotate the shaft clockwise when the housing is pulled rearwardly, along the shaft.

POSITION NO. 11

*Positive lock of shaft on both push and pull*

Position No. 11 of the parts in housing 9, to lock the shaft against rotation in either direction in the housing on both the push and on the pull of the housing with relation to the shaft, is shown in Fig. 21. In this position the saddle members 37 and 38 have been so shifted in the housing as to bring all four of the clutch bar ends 20a, 20b, 21a and 21b into contact with their respective adjacent teeth. This locks the two sleeves 11 and 12 against rotation in either direction in the housing, as a result of which the shaft is locked against rotation in either direction, or longitudinal movement with relation to the housing on both the push and pull of the housing. The contact of clutch bar ends 21a and 21b with teeth 13 and 14 respectively is made possible by providing notches 39 and 40 in saddle members 37 and 38, as described above in connection with Position No. 8 for notch 39, and Position No. 10 for notch 40. Notch 39 is shown in Figs. 5, 10 and 20, and notch 40 is shown in Figs. 4, 5 and 9.

POSITION NO. 12

*Shaft idle on both push and pull*

Position No. 12 of the parts in housing 9, to permit the shaft 1 to freely idle (nonrotative) in the housing upon both the push and pull of the housing along the shaft, is not shown in any of the views of the drawing, but may be easily understood by assuming that the clutch bar ends 20a, 20b, 21a and 21b are all away from contact with teeth 13 and 14. In other words, that saddle member 37 is moved into the position shown in Figs. 2, 5, 12 and 19, and that saddle member 38 is moved into the position shown in Figs. 11, 14 and 17.

In order to operatively hold the two saddle members in proper position with relation to their respective sleeves, as they are moved circumferentially therealong from time to time during their various movements, and prevent them from falling away from the sleeves, each of the saddle handles 35 and 36 (which are rectangular or round in transverse cross-section, as may be desired) are, at a point even with the inner surface of the cylindrical housing, formed of a reduced diameter cylindrical portion or neck 50, which is further reduced in diameter at 51 and threaded to receive the threaded retaining cap or button 52. While this structure is the same for both saddle handles, I have for convenience designated the button for saddle handle 35 as 53, and the button for saddle handle 36 as 52. This construction enables the saddle members to be assembled in their proper place in the housing and against their respective sleeves before screwing the retaining buttons onto the saddle handles 35 and 36. When these buttons are applied after the parts in the housing have been assembled, the saddle members 37 and 38 are free to be moved around their respective sleeves to operate the clutch bars as described above, at which times the reduced diameters 50 of the two saddle handles will slide freely in their respective slots 33 and 34, button 52 being over slot 34, and button 53 being over slot 33. It is thus seen that the various operations described above may be accomplished by selective movements of these two buttons circumferentially of the housing as desired.

In Fig. 1 my helical shaft device is shown as having a clutch 54 fixed to rotate with shaft 1, and having a gripping sleeve 55 rotatable on the clutch and adapted to be held in one hand by the operator while his other hand is moving the handle and housing up and down as desired. While a screw driver 56 has, for illustrative purposes only, been shown as applied to the clutch 54, it is to be understood that the screw driver may be detached from the clutch, and any other tool adapted to be operated by my device, may be applied to the clutch as desired.

Having described my invention, I claim:

1. A helical shaft device, comprising, a shaft having a right hand helical groove and a left hand helical groove, a pair of sleeves on said shaft, one of said sleeves having an internal projection extending into and slidable in said right hand groove, the other one of said sleeves having an internal projection extending into and slidable in said left hand groove, a pair of laterally spaced, longitudinally extending, clutch bars each having a pair of longitudinally spaced clutch portions, each of said sleeves having a circumferential row of teeth, said rows of teeth being spaced apart longitudinally of the shaft, said clutch portions of each clutch bar being simultaneously engageable with both of said rows of teeth, and also simultaneously disengageable from, both of said rows of teeth, and individually selectively engageable therewith..

2. A helical shaft device as claimed in claim 1, having a housing within which said sleeves and said clutch bars are mounted, said clutch bars being rockably mounted in the housing, said clutch portions being positioned one adjacent each of the respective ends of the clutch bars and movable in an approximately radial direction to and from the teeth.

3. Helical shaft apparatus, comprising, a shaft having right hand and left hand helical grooves therein, a pair of sleeves on said shaft, each of said sleeves having an internal projection, one of which projections fits into and is slidable in the right hand groove and the other fits into and is slidable in the left hand groove, a spacer member for holding said sleeves longitudinally spaced apart, a housing encompassing said sleeves and spacer member, said spacer member and housing holding the sleeves in said spaced apart relation, a circumferential row of teeth around the outer end of each sleeve and having circumferential sliding contact with the ends of the spacer member, a pair of clutch bars one on each side of said sleeves and each having end portions opposite said rows of teeth respectively, and a pair of shifting saddle members one adjacent one end of said pair of clutch bars and one adjacent the other end thereof, whereby said saddle members may be shifted circumferentially in either direction to selectively bring the ends of the clutch bars into and out of engagement with said teeth.

4. Apparatus as claimed in claim 3, in which said clutch bars are both located on the same side of a plane passing through the longitudinal central axis of the shaft, whereby the end portions of the clutch bar on one side of said sleeves will enable the teeth to slip thereby in one direction of rotation and block rotation in the other direction, and the end portions of the clutch bars on the other side of said sleeves will perform the same operations in the opposite directions.

5. A helical shaft device, comprising, a shaft having a right hand and a left hand helical groove extending longitudinally therein, a pair of sleeves on said shaft, one of said sleeves being formed to follow the right hand groove and the other sleeve being formed to follow the left hand groove, a circumferential row of teeth on each of the outer ends of the sleeves, a pair of clutch bars extending longitudinally one on each of the opposite sides of the pair of sleeves and having their four ends at all times overlapping said rows of teeth and being engageable therewith and disengageable therefrom, shiftable members for selectively shifting the respective ends of the clutch bars into and out of contact with the respective adjacent teeth, said clutch bars being both located within the same semi-circle around said sleeves so that said teeth when moving out of said semi-circle will slide idly by their adjacent clutch bar ends, and when moving into said semi-circle will be stopped by the respective adjacent clutch bar ends, when the clutch bar end is pressed against the teeth, the four end portions of the two clutch bars all contacting the teeth in one position of the shiftable members, and all being away from the teeth in another position of the shiftable members.

6. A helical shaft device, comprising, a shaft having a right hand and a left hand helical groove extending longitudinally therein, a pair of sleeves on said shaft, one of said sleeves being formed to follow the right hand groove and the other sleeve being formed to follow the left hand groove, a circumferential row of teeth adjacent each of the outer ends of the sleeves, a pair of clutch bars extending longitudinally one on each of the opposite sides of the pair of sleeves and having their four ends at all times overlapping said rows of teeth and being engageable therewith and disengageable therefrom, shiftable members for selectively shifting the respective ends of the clutch bars into and out of contact with the respective adjacent teeth, and a housing containing said shaft, sleeves, clutch bars and shiftable members, said clutch bars being both located on the same side of a diametrical longitudinal plane relative to the shaft, both ends of one clutch bar being in contact with the adjacent teeth and both ends of the other clutch bar being away from the adjacent teeth when the shiftable members are in one position whereby said shaft is continuously rotatable in a clockwise direction upon movement of the housing in either direction along the shaft, and both ends of said other clutch bar being in contact with the adjacent teeth and both ends of said one clutch bar being away from the adjacent teeth when the shiftable members are in another position whereby said shaft is continuously rotatable in a counter-clockwise direction upon movement of the housing in either direction along the shaft.

7. A helical shaft device, comprising, a shaft having a right hand and a left hand helical groove extending longitudinally therein, a pair of sleeves on said shaft, one of said sleeves being formed to follow the right hand groove and the other sleeve being formed to follow the left hand groove, a circumferential row of teeth on each of the outer ends of the sleeves, a pair of clutch bars extending longitudinally one on each of the opposite sides of the pair of sleeves and having their ends overlapping said rows of teeth, shiftable members for selectively shifting the respective ends of the clutch bars into and out of contact with the respective adjacent teeth, said shiftable members being two in number and each having an arcuate inner face to circumferentially slide one on each of said sleeves, one of said shiftable members being nearer one end of said clutch bars, and the other being nearer the other end of the clutch bars.

8. A helical device as claimed in claim 7, in which spring means are provided behind each of said clutch bars for moving each end of each of said clutch bars against the adjacent teeth except when held away therefrom by said shiftable members.

9. A helical device as claimed in claim 8, in which one of said shiftable members is formed on its outer surface adjacent one end with a notch for selectively receiving one of said clutch bars.

10. A helical device as claimed in claim 8, in which each of said shiftable members is formed on its outer surface adjacent one end with a notch for selectively receiving one of said clutch bars to increase the range of operations of the shaft upon movements of the housing longitudinally therealong.

11. A helical shaft machine, comprising, a shaft having a right hand and a left hand helical groove extending longitudinally therein, a pair of sleeves on said shaft, one of said sleeves being formed to follow the right hand groove and the other sleeve being formed to follow the left hand groove, a circumferential row of teeth on each of the outer ends of the sleeves, a pair of clutch bars extending longitudinally one on each of the opposite sides of the pair of sleeves and having their ends overlapping said rows of teeth, a housing around said sleeves and clutch bars, spring means between each clutch bar and the housing to normally urge the clutch bar ends toward the respective adjacent teeth, shifting members for selectively moving the clutch bar ends away from the teeth, one of said clutch bars being arranged so that the teeth at its respective ends may slip by the adjacent clutch bar end when the teeth rotate in a clockwise direction as viewed from the rear end of the shaft and will lock when the teeth rotate in a counterclockwise direction when these clutch bar ends are selectively in contact with said teeth, and the other clutch bar being arranged so that the teeth at its respective ends may slip by the adjacent clutch bar end when the teeth rotate in a counterclockwise direction and lock when the teeth rotate in a clockwise direction when these clutch bar ends are selectively in contact with their adjacent teeth.

12. A helical shaft machine, comprising, a shaft having a right hand and a left hand helical groove extending longitudinally therealong, a pair of sleeves on said shaft, one of said sleeves being formed to follow the right hand groove and the other sleeve being formed to follow the left hand groove, teeth on each of said sleeves, a pair of laterally spaced longitudinally extending clutch bars outside of said sleeves, each of said clutch bars having a pair of longitudinally spaced clutch portions facing said sleeves respectively, the two clutch portions toward one end of the two clutch bars lying over the teeth on one sleeve, the two clutch portions toward the other end of the two clutch bars lying over the teeth on the other sleeve, spring means for biasing said clutch portions with relation to said teeth, and shifting means adjacent said clutch portions for selectively overcoming the bias of the spring means, said four clutch portions having four possible relative contacts with said teeth upon operation of said shifting means.

13. Helical shaft apparatus, comprising, a shaft having a right hand helical groove extending longitudinally therein, and a left hand helical groove extending longitudinally therein, a housing through which said shaft extends, a pair of sleeves on said shaft, one of said sleeves having an internal projection slidable in the right hand groove, the other sleeve having an internal projection slidable in the left hand groove, each of said sleeves having a circumferential row of teeth, said rows of teeth being longitudinally spaced apart, said sleeves being rotatable in said housing but held against longitudinal movement with relation thereto, a clutch bar rockably mounted in the housing and having a pair of longitudinally spaced clutch portions extending respectively over said teeth, spring means normally urging both of said clutch portions toward said teeth, a first shifting member adjacent one of said clutch portions which when pushed under the clutch bar will move that clutch portion away from the adjacent teeth and when moved away from the clutch bar will free that clutch portion to move against the adjacent teeth under action of said spring means, a second shifting member adjacent the other one of said clutch portions and having an action with relation thereto similar to that of said first shifting member with relation to its clutch portion, whereby either of said clutch portions may be selectively moved against or away from its respective teeth, and both of said clutch portions may be selectively moved into simultaneous contact with both rows of teeth and also move simultaneously away from both rows of teeth.

14. Helical shaft apparatus, comprising, a shaft having a right hand and a left hand helical groove extending longitudinally therein, a pair of sleeves on said shaft, one of said sleeves being formed to follow the right hand groove and the other being formed to follow the left hand groove, a circumferential row of teeth on each of said sleeves, said rows of teeth being spaced apart longitudinally of the shaft, a pair of laterally spaced clutch bars each having a pair of longitudinally spaced clutch portions thus forming four clutch portions two of which overlap one of said rows of teeth and the other two overlap the other row of teeth, spring means for biasing each of said clutch portions with relation to its respective row of teeth, and shifting means for shifting said clutch portions against the bias of said spring means, each of the four clutch portions being movable in an approximately radial direction against and away from the adjacent row of teeth under action of the spring means and the shifting means, thus providing four points of contact between the clutch portions and the teeth, the spring means and the shifting means providing means for engaging and disengaging any one, two, three or four of said points of contact with their respective teeth, and any combination thereof.

15. Apparatus as claimed in claim 14, including a housing around said shaft, sleeves, clutch bars and shifting means, said shifting means being movable sidewise of the housing and comprising a pair of separately shiftable saddle members each of a length to simultaneously contact both of said clutch bars when moved to that position.

16. A helical shaft machine comprising, a shaft having a right hand and a left hand helical groove extending longitudinally therealong, a pair of sleeves on said shaft, one of said sleeves being formed to follow the right hand groove and the other sleeve being formed to follow the left hand groove, a circumferential row of teeth on each sleeve, a pair of laterally spaced rockable clutch bars extending longitudinally between the two rows of teeth and overlapping the same adjacent each end of each clutch bar, spring means for biasing each of said clutch bar ends with relation to said teeth, a shifting saddle adjacent one row of teeth for overcoming said bias with relation to that row of teeth for one or both of the corresponding clutch bar ends, and a shifting saddle adjacent the other row of teeth for overcoming said bias with relation to the last mentioned row of teeth for one or both of the corresponding clutch bar ends, said spring means and shifting saddles, upon shifting of said saddles, causing selective engagement and disengagement of either or both ends of each clutch bar with relation to the adjacent teeth.

17. A machine as claimed in claim 16, in which the clutch bars are so arranged with relation to the two rows of teeth, that when both ends of one clutch bar are in contact with their respective teeth and both ends of the other clutch bar are out of contact with their respective teeth, one of the sleeves will be held against counterclockwise rotation in the housing and the other sleeve will rotate freely in a clockwise direction in the housing when the housing is pushed forwardly along the shaft, and when the housing is pulled rearwardly along the shaft the reverse operation of the sleeves will take place, whereby the shaft will rotate clockwise on both a push and a pull of the housing.

WILLIAM E. DE WALD.

References Cited in the file of this patent

UNITED STATES PATENTS

| Number | Name | Date |
|---|---|---|
| 942,571 | Leland | Dec. 7, 1909 |
| 2,301,413 | Kilcup | Nov. 10, 1942 |
| 2,521,816 | Adams | Sept. 12, 1950 |